US010080145B2

United States Patent
Mae et al.

(10) Patent No.: US 10,080,145 B2
(45) Date of Patent: Sep. 18, 2018

(54) COMMUNICATION APPARATUS, NON-TRANSITORY COMPUTER-READABLE STORAGE MEDIUM HAVING STORED THEREIN COMMUNICATION PROGRAM, COMMUNICATION SYSTEM, AND COMMUNICATION METHOD

(71) Applicants: Kenichi Mae, Kusatsu (JP); Yoshitaka Imura, Ikoma (JP); Yoshihisa Kondo, Kizugawa (JP); Masaru Shimomura, Otsu (JP)

(72) Inventors: Kenichi Mae, Kusatsu (JP); Yoshitaka Imura, Ikoma (JP); Yoshihisa Kondo, Kizugawa (JP); Masaru Shimomura, Otsu (JP)

(73) Assignee: Nintendo Co., Ltd., Kyoto (JP)

( * ) Notice: Subject to any disclaimer, the term of this patent is extended or adjusted under 35 U.S.C. 154(b) by 202 days.

(21) Appl. No.: 14/600,643

(22) Filed: Jan. 20, 2015

(65) Prior Publication Data
US 2015/0208250 A1    Jul. 23, 2015

(30) Foreign Application Priority Data

Jan. 20, 2014   (JP) .................................. 2014-007908

(51) Int. Cl.
*H04W 16/26* (2009.01)
*H04B 7/155* (2006.01)
*H04W 84/12* (2009.01)

(52) U.S. Cl.
CPC ......... *H04W 16/26* (2013.01); *H04B 7/15507* (2013.01); *H04W 84/12* (2013.01)

(58) Field of Classification Search
CPC ... H04B 7/15507; H04W 16/26; H04W 84/12

USPC ......................................................... 370/315
See application file for complete search history.

(56) References Cited

U.S. PATENT DOCUMENTS

| 2004/0125762 | A1* | 7/2004 | Haller | ............... H04L 29/12311 370/313 |
| 2004/0179512 | A1* | 9/2004 | Leblanc | .................. H04L 29/06 370/352 |
| 2006/0268823 | A1* | 11/2006 | Kim | ..................... H04W 72/005 370/349 |

(Continued)

FOREIGN PATENT DOCUMENTS

| JP | 2003-249937 | 9/2003 |
| JP | 2004-356945 | 12/2004 |

(Continued)

OTHER PUBLICATIONS

Office Action dated Nov. 27, 2017 issued in corresponding Japanese Patent Appln. No. 2014-007908.

*Primary Examiner* — Omar J Ghowrwal
*Assistant Examiner* — Kokou R Detse
(74) *Attorney, Agent, or Firm* — Nixon & Vanderhye, P.C.

(57) ABSTRACT

An example of a communication system includes a wireless LAN access point, a master, and a client. The master connects to a wireless LAN access point present within a first communicable range via a wireless LAN. Further, the master communicates with the client present within a second communicable range, which is broader than the first communicable range. The client connects to the wireless LAN access point via the master even if the client is not directly connected to the wireless LAN access point.

19 Claims, 9 Drawing Sheets

(56) References Cited

U.S. PATENT DOCUMENTS

| | | | |
|---|---|---|---|
| 2007/0281791 A1* | 12/2007 | Ichikawa | A63F 13/10 |
| | | | 463/42 |
| 2011/0299613 A1* | 12/2011 | Duff | H04L 43/10 |
| | | | 375/260 |
| 2012/0078756 A1 | 3/2012 | Tsugihashi et al. | |
| 2012/0307709 A1* | 12/2012 | Ostergaard | H04L 1/1685 |
| | | | 370/315 |
| 2014/0341105 A1* | 11/2014 | Vardhan | H04W 24/02 |
| | | | 370/315 |
| 2015/0092688 A1* | 4/2015 | Jeong | H04W 60/005 |
| | | | 370/329 |

FOREIGN PATENT DOCUMENTS

| | | | |
|---|---|---|---|
| JP | 2005-341300 | 12/2005 | |
| JP | 2012-69001 | 4/2012 | |
| WO | WO 2012140477 A1 * | 10/2012 | H04L 9/3236 |

* cited by examiner

COMMUNICATION APPARATUS, NON-TRANSITORY COMPUTER-READABLE STORAGE MEDIUM HAVING STORED THEREIN COMMUNICATION PROGRAM, COMMUNICATION SYSTEM, AND COMMUNICATION METHOD

CROSS REFERENCE TO RELATED APPLICATION

The disclosure of Japanese Patent Application No. 2014-007908, filed on Jan. 20, 2014, is incorporated herein by reference.

FIELD

The technology disclosed here relates to a communication apparatus, a communication program, a communication system, and a communication method having a wireless communication function.

BACKGROUND AND SUMMARY

Conventionally, there is a mobile terminal capable of connecting to a wireless network. Such a terminal searches for an access point present around the terminal itself and connects to the access point, thereby connecting to an external network.

In the conventional technique, however, if there is no access point around the terminal, the terminal cannot connect to an external network.

Therefore, it is an object of an exemplary embodiment to provide a communication technique capable of varying a connection path to a network.

To achieve the above object, the exemplary embodiment employs the following configurations.

An exemplary embodiment is a communication apparatus having a wireless communication function, and the communication apparatus includes a first communicator, a second communicator, and a transmitter. The first communicator performs wireless communication with a wireless LAN access point present within a first communicable range. The second communicator performs wireless communication with another apparatus present within a second communicable range different from the first communicable range. The transmitter transmits data, which is transmitted from the other apparatus and received by the second communicator, to the wireless LAN access point with the first communicator, thereby communicating between the other apparatus and the wireless LAN access point.

Based on the above, a communication apparatus can transmit data from another apparatus to a wireless LAN access point and communicate between the other apparatus and the wireless LAN access point. Thus, even if another apparatus cannot directly connect to a wireless LAN access point, it is possible to allow the other apparatus to communicate with the wireless LAN access point.

Further, in another configuration, the second communicable range may be broader than the first communicable range.

Based on the above, it is possible to allow another apparatus relatively distant from a wireless LAN access point to connect to the wireless LAN access point.

Further, in another configuration, the second communicator may communicate with the other apparatus, using at least one of a method of using a plurality of antennas, a method of using a bandwidth narrower than a bandwidth in communication using the first communicator, and a method of using a radio wave having a frequency lower than a frequency in communication using the first communicator.

Based on the above, it is possible, using a second communicator, to achieve communication in a range broader than that of communication using a first communicator.

Further, in another configuration, a protocol of communication between the communication apparatus and the other apparatus performed using the second communicator may be substantially the same as a protocol of communication between the communication apparatus and the access point performed using the first communicator.

Based on the above, it is possible to perform communication using a common protocol without using a dedicated protocol for communication using a second communicator.

Further, in another configuration, the communication apparatus may further include a setter. The setter makes a setting of whether or not to permit the transmitter to communicate between the other apparatus and the wireless LAN access point. If the setter has permitted the transmitter to communicate between the other apparatus and the wireless LAN access point, the transmitter communicates between the other apparatus and the wireless LAN access point.

Based on the above, it is possible to make the setting of whether or not to permit a relay of communication using a second communicator.

Further, in another configuration, the setter may set another apparatus for which the transmitter is permitted to communicate between the other apparatus and the wireless LAN access point. The transmitter communicates between the other apparatus that has been set and the wireless LAN access point.

Based on the above, it is possible to set an apparatus for which the relay of communication is permitted, and it is possible to communicate between the communication apparatus and the apparatus for which the relay has been permitted.

Further, in another configuration, the first communicator may be able to transmit data generated by the communication apparatus to the wireless LAN access point in addition to data from the other apparatus.

Based on the above, the communication apparatus can transmit, for example, data generated by the communication apparatus itself executing an application to the wireless LAN access point in addition to data from the other apparatus.

Further, in another configuration, the communication apparatus may communicate, using the second communicator of the communication apparatus, with a third apparatus including the first communicator, the second communicator, and the transmitter. The third apparatus communicates with the wireless LAN access point, using the first communicator of the third apparatus. The second communicator of the communication apparatus may transmit, via the third apparatus, data to the wireless LAN access point connected to the third apparatus.

It should be noted that the third apparatus may be the other apparatus or may be yet another apparatus different from the other apparatus.

Based on the above, the communication apparatus can connect to the wireless LAN access point via a third apparatus.

Further, in another configuration, if the communication apparatus cannot communicate with the wireless LAN access point, using the first communicator of the communication apparatus, the second communicator of the communication apparatus may automatically connect to the third apparatus and communicate via the third apparatus with a wireless LAN access point connected to the third apparatus.

Based on the above, if it is not possible to directly connect to the wireless LAN access point, it is possible to connect to the wireless LAN access point via the third apparatus.

Further, in another configuration, the communication apparatus may further include a setter. The setter makes a setting of whether or not to permit the transmitter to communicate between the other apparatus and the wireless LAN access point. If the setter has permitted the transmitter to communicate between the other apparatus and the wireless LAN access point, the transmitter communicates between the other apparatus and the wireless LAN access point. If the setter has permitted the transmitter to communicate between the other apparatus and the wireless LAN access point, the second communicator of the communication apparatus communicates via the third apparatus with a wireless LAN access point connected to the third apparatus.

Based on the above, if a relay of communication is permitted for another apparatus, the communication apparatus can connect to the wireless LAN access point via the third apparatus.

Further, in another configuration, the communication apparatus and the other apparatus may be apparatuses of the same model. Further, the communication apparatus and the third apparatus may be apparatuses of the same model.

Further, in another configuration, the communication apparatus may be a handheld apparatus.

Further, in another configuration, the communication apparatus may be an apparatus capable of executing a predetermined application.

Further, another form is a communication system including a first communication apparatus and a second communication apparatus. The first communication apparatus includes a first communicator, a second communicator, and a transmitter. The first communicator performs wireless communication with a wireless LAN access point present within a first communicable range. The second communicator performs wireless communication with the second communication apparatus present within a second communicable range different from the first communicable range. The transmitter transmits data, which is transmitted from the second communication apparatus and received by the second communicator, to the wireless LAN access point with the first communicator, thereby communicating between the second communication apparatus and the wireless LAN access point. The second communication apparatus includes a third communicator configured to perform wireless communication with the first communication apparatus present within the second communicable range. The third communicator of the second communication apparatus communicates with the wireless LAN access point via the first communication apparatus.

Further, in another configuration, the second communication apparatus may communicate with the wireless LAN access point via the first communication apparatus without having information for directly communicating with the wireless LAN access point.

Further, in another configuration, the communication system may include a plurality of first communication apparatuses. The second communication apparatus further includes an acquirer and a selector. The acquirer acquires status information of the plurality of first communication apparatuses present within the second communicable range. The selector selects any one of the plurality of first communication apparatuses based on the status information acquired by the acquirer. The third communicator of the second communication apparatus communicates with the wireless LAN access point via the first communication apparatus selected by the selector.

Further, another form may be a communication program executed by at least one processor for achieving the above communication or may be a communication method.

According to the exemplary embodiment, a communication apparatus can communicate between another apparatus and a wireless LAN access point.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
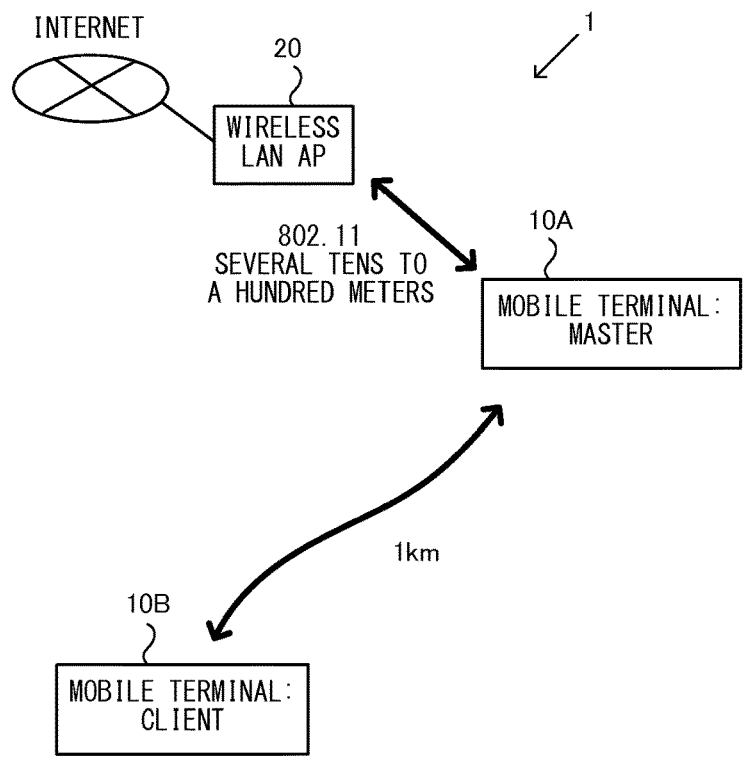
FIG. 1 is a diagram showing a non-limiting example of a communication system 1, which includes a mobile terminal 10 according to an exemplary embodiment.

A communication system according to an exemplary embodiment is described below. FIG. 1 is a diagram showing an example of a communication system 1, which includes a mobile terminals 10 according to the exemplary embodiment.

As shown in FIG. 1, the communication system 1 includes a mobile terminal 10A, a mobile terminal 10B, and a wireless LAN access point (AP) 20. The mobile terminal 10A and the mobile terminal 10B are handheld information processing terminals of the same model, and each of the mobile terminal 10A and the mobile terminal 10B may be, for example, a handheld game apparatus, a mobile phone, a tablet terminal, or the like. Hereinafter, the mobile terminal 10A and the mobile terminal 10B are occasionally collectively referred to as a "mobile terminal 10".

As shown in FIG. 1, the mobile terminal 10A can connect to the wireless LAN access point 20 via a wireless LAN. As a method of the wireless LAN, for example, IEEE 802.11 series (e.g., IEEE 802.11a. 802.11b, 802.11g, 802.11n, and the like) is employed. The wireless LAN access point 20 is, for example, installed in a home of a user of the mobile terminal 10A, or installed in a public area to provide a wireless LAN service to specified or unspecified users. The wireless LAN access point 20 is connected to another network in a wired or wireless manner and can connect to the Internet. The mobile terminal 10A can connect to the Internet via the wireless LAN access point 20. The distance at which the mobile terminal 10A can communicate with the wireless LAN access point 20 is up to several tens or a hundred meters. Hereinafter, this distance is occasionally referred to as a "first communicable range".

The mobile terminal 10 can operate as a master or a client. As shown in FIG. 1, the mobile terminal 10A functions as a master, and the mobile terminal 10B functions as a client.

The mobile terminal 10B is connected to the mobile terminal 10A so that the mobile terminal 10B can communicate wirelessly with the mobile terminal 10A. The distance at which the mobile terminal 10A can communicate with the mobile terminal 10B is a second communicable range, which is broader than the first communicable range and is, for example, about 1 km. The mobile terminal 10B can communicate with the wireless LAN access point 20 and connect to the Internet via the mobile terminal 10A. That is, the mobile terminal 10A communicates (relays the communication) between the mobile terminal 10B and the wireless LAN access point 20. The mobile terminal 10B can connect to the wireless LAN access point 20 (the Internet) via the mobile terminal 10A even if the mobile terminal 10B is not directly connected to the wireless LAN access point 20. The mobile terminal 10B transmits, for example, data having a relatively small amount of data, such as a short message, to the wireless LAN access point 20 (the Internet) via the mobile terminal 10A.

It should be noted that if the mobile terminal 10B can directly connect to the wireless LAN access point 20, the mobile terminal 10B does not connect to the wireless LAN access point 20 via the mobile terminal 10A, but directly connects to the wireless LAN access point 20.

Here, the communication between the mobile terminal 10A and the mobile terminal 10B is termed "wide-area wireless communication", and the communication between the mobile terminal 10A and the wireless LAN access point 20 is termed "wireless LAN communication". The method of achieving the wide-area wireless communication between the mobile terminal 10A and the mobile terminal 10B will be described later.

To perform the wireless LAN communication between the mobile terminal 10A and the wireless LAN access point 20, an authentication process needs to be completed between the mobile terminal 10A and the wireless LAN access point 20. For example, if the wireless LAN access point 20 is provided as a paid public wireless service, the user of the mobile terminal 10A cannot use the service without a contract to use the service. Further, even if the wireless LAN access point 20 is provided as a free public wireless service, the mobile terminal 10A cannot connect to the wireless LAN access point 20 unless the settings for using the service have been made in the mobile terminal 10A. Specifically, information (an SSID and a key for authentication) for connecting to the wireless LAN access point 20 needs to have been registered in (or input by the user to) the mobile terminal 10A. Further, also if the wireless LAN access point 20 is installed in the home of the user, information for connecting to the wireless LAN access point 20 needs to have been stored in (input by the user to) the mobile terminal 10A in advance.

On the other hand, to perform the wide-area wireless communication between the mobile terminal 10A and the mobile terminal 10B, a contract for a service necessary in the wireless LAN communication or information for connection necessary in the wireless LAN communication does not need to have been stored. That is, the mobile terminal 10B can connect to the wireless LAN access point 20 via the mobile terminal 10A without having information for connecting to the wireless LAN access point 20.

It should be noted that FIG. 1 shows the case where a single client (the mobile terminal 10B) connects to a master (the mobile terminal 10A). Alternatively, a plurality of clients can connect to the wireless LAN access point 20 via a master.

Figure 2:
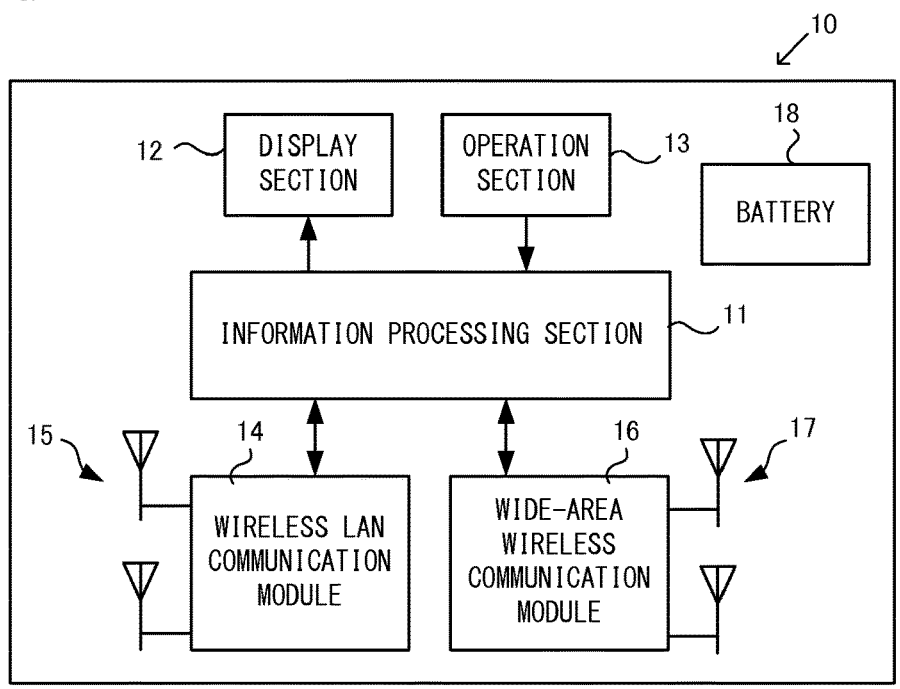
FIG. 2 is a block diagram showing a non-limiting example of the functional configuration of the mobile terminal 10 according to the exemplary embodiment.

FIG. 2 is a block diagram showing the functional configuration of the mobile terminal 10 according to the exemplary embodiment. As shown in FIG. 2, the mobile terminal 10 includes an information processing section 11, a display section 12, an operation section 13, a wireless LAN communication module 14, antennas 15, a wide-area wireless communication module 16, and antennas 17. It should be noted that the wireless LAN communication module 14, the antennas 15, the wide-area wireless communication module 16, and the antennas 17 may be integrated into a single module. Alternatively, some of these components 14 to 17 may be configured as an integrated module (for example, the wide-area wireless communication module 16 and the antennas 17 may be configured as a single module, or the wireless LAN communication module 14 and the wide-area wireless communication module 16 may be configured as a single module). Further, the mobile terminal 10 includes a battery 18 for supplying power to the mobile terminal 10.

The information processing section 11 performs various calculations, data processing, an image generation process, and the like. The information processing section 11 can, for example, execute an application program such as a game program, an application for displaying a moving image and a still image, an application for reproducing music, an application for viewing a document, and the like. The information processing section 11 includes a RAM for temporarily storing data for calculations and data processing and may include a plurality of processors.

The information processing section 11 is connected to the components of the mobile terminal 10. The display section 12 displays an image generated by the information processing section 11. The display section 12 may include a single screen or two or more screens. The operation section 13 receives an operation performed by the user. The operation section 13 may include, for example, a touch panel provided on a screen of the display section 12, a plurality of operation buttons, an analog stick, a directional pad, and the like.

The wireless LAN communication module 14 is a communication module for performing the wireless LAN communication with the wireless LAN access point 20 and is connected to the plurality of antennas 15. For example, wireless communication using the wireless LAN communication module 14 employs MIMO (Multiple-Input and Multiple-Output) technology. MIMO is a technique for improving the communication quality using a plurality of antennas and is employed in wireless communication standards such as IEEE 802.11n, 4G, 3GLTE, WiMAX™, and HSPA. It should be noted that a single antenna 15 may be provided.

Further, the wide-area wireless communication module 16 is a communication module for performing the wide-area wireless communication with another mobile terminal 10 and is connected to the plurality of antennas 17. For example, wireless communication using the wide-area wireless communication module 16 employs MIMO technology. It should be noted that even a single antenna 17 enables the wide-area wireless communication.

Figure 3A:
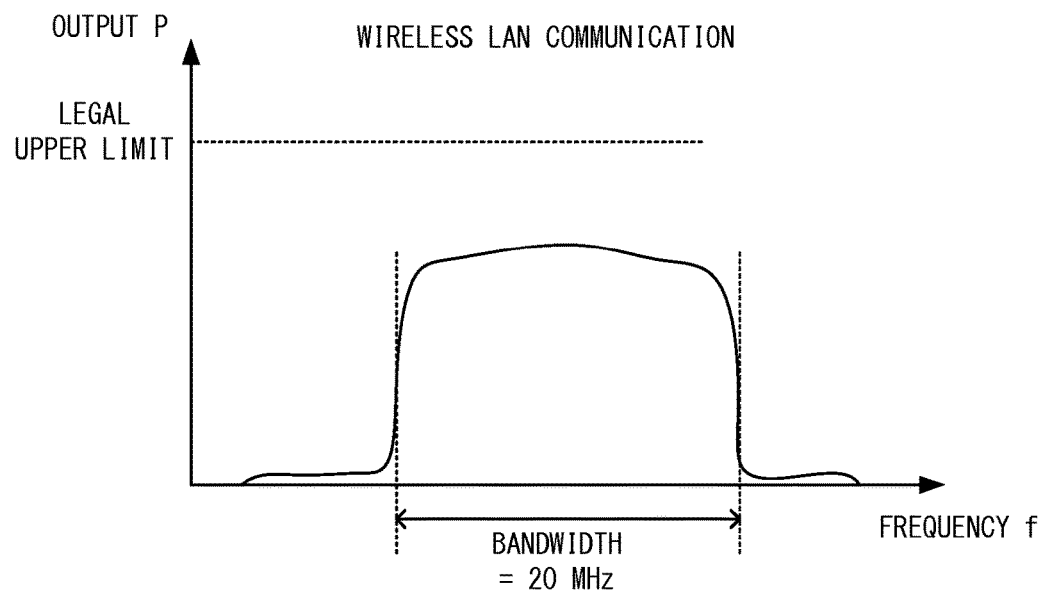
FIG. 3A is a diagram showing a non-limiting example of the relationship between the bandwidth and the output of radio waves in wireless LAN communication with a wireless LAN access point 20.
Figure 3B:
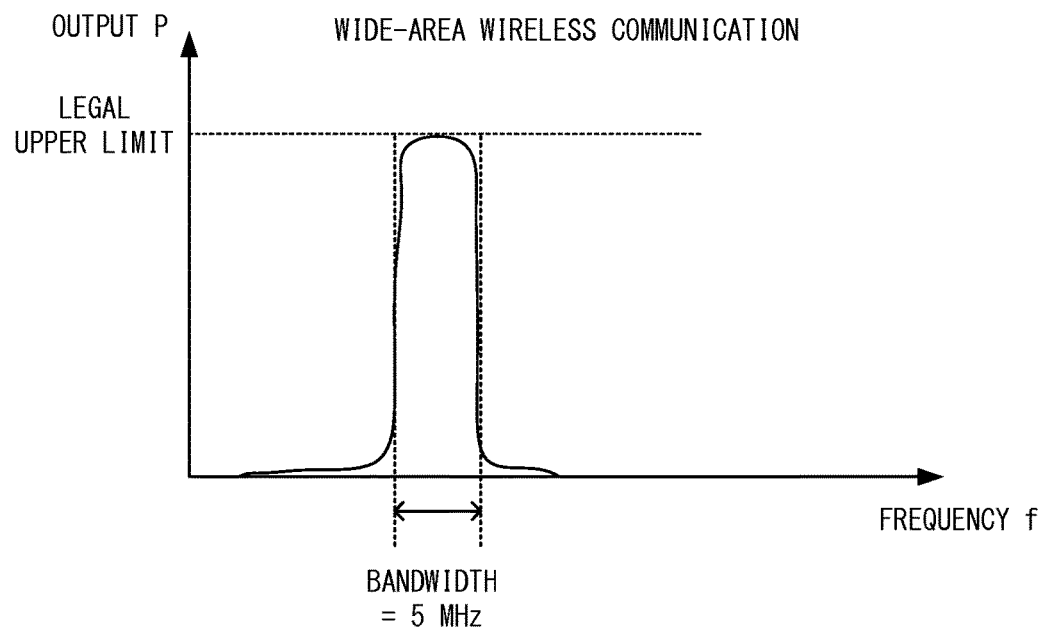
FIG. 3B is a diagram showing a non-limiting example of the relationship between the bandwidth and the output of radio waves in wide-area wireless communication with another mobile terminal 10.

Next, a description is given of the method for the mobile terminal 10 to achieve the wide-area wireless communication with another mobile terminal 10. FIG. 3A is a diagram showing the relationship between the bandwidth and the output of radio waves in the wireless LAN communication with the wireless LAN access point 20. FIG. 3B is a diagram showing the relationship between the bandwidth and the output of radio waves in the wide-area wireless communication with another mobile terminal 10.

As shown in FIG. 3A, in the wireless LAN communication using the wireless LAN communication module 14 (e.g., IEEE 802.11g or the like), the frequency bandwidth (channel width) is, for example, 20 MHz. The wireless LAN communication using the mobile terminal 10 is performed in the range of maximum output determined by national legislation. For example, in the wireless LAN communication using the mobile terminal 10, radio waves are transmitted as output lower than a legal upper limit.

On the other hand, as shown in FIG. 3B, in the wide-area wireless communication using the wide-area wireless communication module 16, the frequency bandwidth is narrower than the bandwidth of the wireless LAN communication using the wireless LAN communication module 14. In the wide-area wireless communication, the bandwidth is, for example, 5 MHz. That is, in the wide-area wireless communication, the bandwidth is narrower than that of the wireless LAN communication. As shown in FIG. 3B, the bandwidth is narrower than that of the wireless LAN communication, whereby it is possible to reduce the influence of noise and achieve communication in a range broader than that of the wireless LAN communication.

Figure 4A:
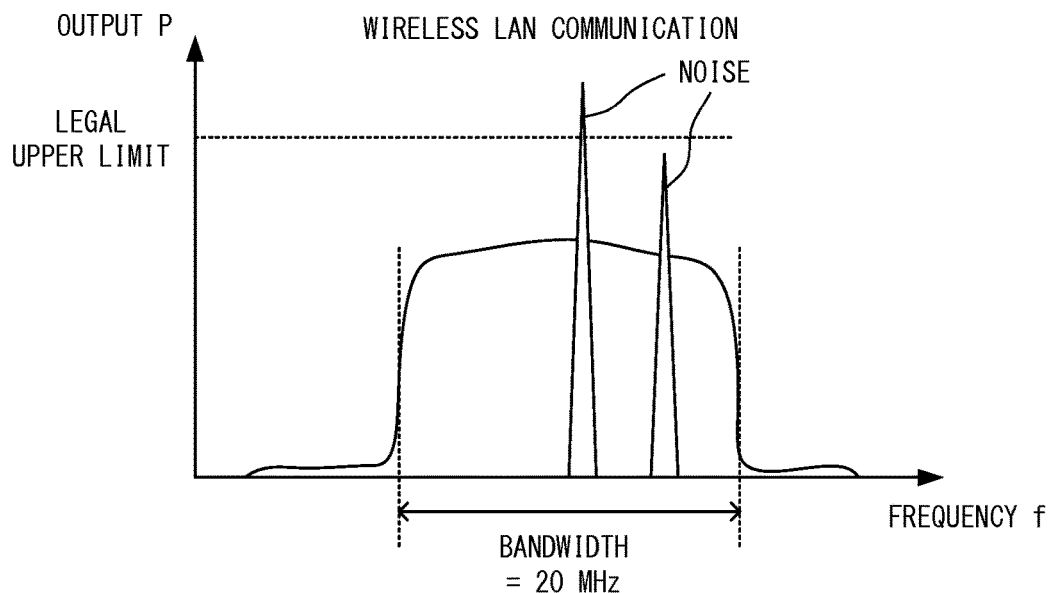
FIG. 4A is a diagram showing a non-limiting example of the influence of noise in the wireless LAN communication.
Figure 4B:
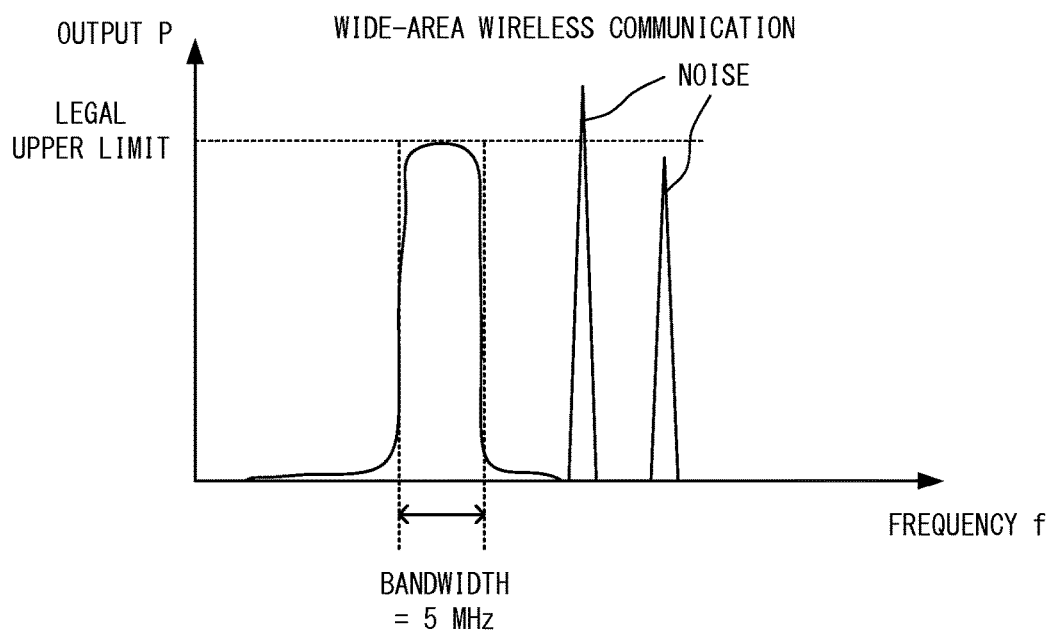
FIG. 4B is a diagram showing a non-limiting example of the influence of noise in the wide-area wireless communication.

FIG. 4A is a diagram showing the influence of noise in the wireless LAN communication. FIG. 4B is a diagram showing the influence of noise in the wide-area wireless communication.

As shown in FIG. 4A, in the wireless LAN communication, of which the bandwidth is wide, noise is included in the range of frequencies used in the wireless LAN communication. Thus, the wireless LAN communication is likely to be influenced by noise. That is, noise randomly occurs in the entire frequency range. Thus, the wider the bandwidth for communication, the more likely the band can include noise. Thus, the wider the bandwidth, the more likely the communication is influenced by noise. This makes it difficult to perform relatively long-distance communication. On the other hand, as shown in FIG. 4B, in the wide-area wireless communication, of which the bandwidth is narrow, the narrow bandwidth reduces the total amount of noise (even if the total transmission power is the same in FIGS. 4A and 4B). As a result, the communication is less likely to be influenced by noise. Thus, the wide-area wireless communication is less likely to be influenced by noise than the wireless LAN communication. This makes it possible to perform long-distance communication.

It should be noted that not only noise that randomly occurs as shown in FIGS. 4A and 4B, but also another type of noise (e.g., multipath noise) influences the wide-area wireless communication, of which the bandwidth is narrow, less than the wireless LAN communication, of which the bandwidth is wide.

Further, as shown in FIG. 3B, in the wide-area wireless communication, the output of radio waves is set to be higher than that of the wireless LAN communication. For example, in the wide-area wireless communication, radio waves are transmitted as output near the legal upper limit. The power consumption depends on the area surrounded by a curve shown in each of FIGS. 3A and 3B. In the wireless LAN communication, of which the bandwidth is wide, an increase in the output increases the area surrounded by the curve and therefore increases the power consumption. Since the mobile terminal 10 is driven by the battery 18, it is not possible to increase the output in the wireless LAN communication, of which the bandwidth is wide. However, in the wide-area wireless communication, of which the bandwidth is narrow, even an increase in the output makes small the area surrounded by the curve. Thus, the power consumption is relatively low (particularly in terms of the power consumption per unit time when data is transmitted).

Figure 5:
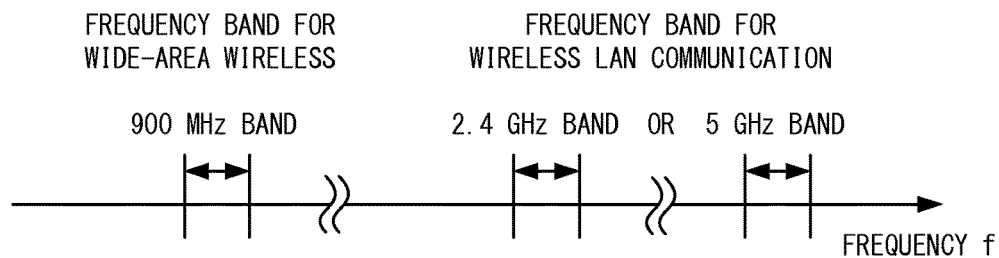
FIG. 5 is a diagram showing non-limiting examples of the frequency band of radio waves in the wireless LAN communication and the frequency band of radio waves in the wide-area wireless communication.

FIG. 5 is a diagram showing the frequency band of radio waves in the wireless LAN communication and the frequency band of radio waves in the wide-area wireless communication.

As shown in FIG. 5, in the wireless LAN communication, the frequencies of radio waves are included in the 2.4 GHz band or the 5 GHz band. On the other hand, in the wide-area wireless communication, the frequencies of radio waves are included in, for example, the 900 MHz band (e.g., although the range of 800 MHz to 1000 MHz can be assumed, basically, radio wave frequencies (the 400 MHz band or the like) lower than the radio wave frequencies of the wireless LAN communication can be used in the exemplary embodiment). Generally, the lower the frequencies of radio waves (the longer the wavelengths), the smaller the loss. Further, even if there is an obstacle such as a building, the radio waves are likely to go around behind the obstacle due to their properties. This enables long-distance communication. Thus, the communicable range is broader in the wide-area wireless communication, which uses radio waves in the 900 MHz band, than in the wireless LAN communication, which uses radio waves in the 2.4 GHz band or the 5 GHz band.

As described above, in the wide-area wireless communication using the wide-area wireless communication module 16, the bandwidth is narrower than that of the wireless LAN communication, and the frequencies are lower than those of the wireless LAN communication. Further, in the exemplary embodiment, the wide-area wireless communication module 16 is connected to the plurality of antennas 17. With the combination of these, in the wide-area wireless communication using the wide-area wireless communication module 16, it is possible to perform communication even if the mobile terminal 10A and the mobile terminal 10B are about 1 km away from each other.

In the exemplary embodiment, the setting of whether or not to permit the mobile terminal 10 to function as a master (i.e., provide a communication relay function to a client) or prohibit the mobile terminal 10 from functioning as a master may be made.

Figure 6:
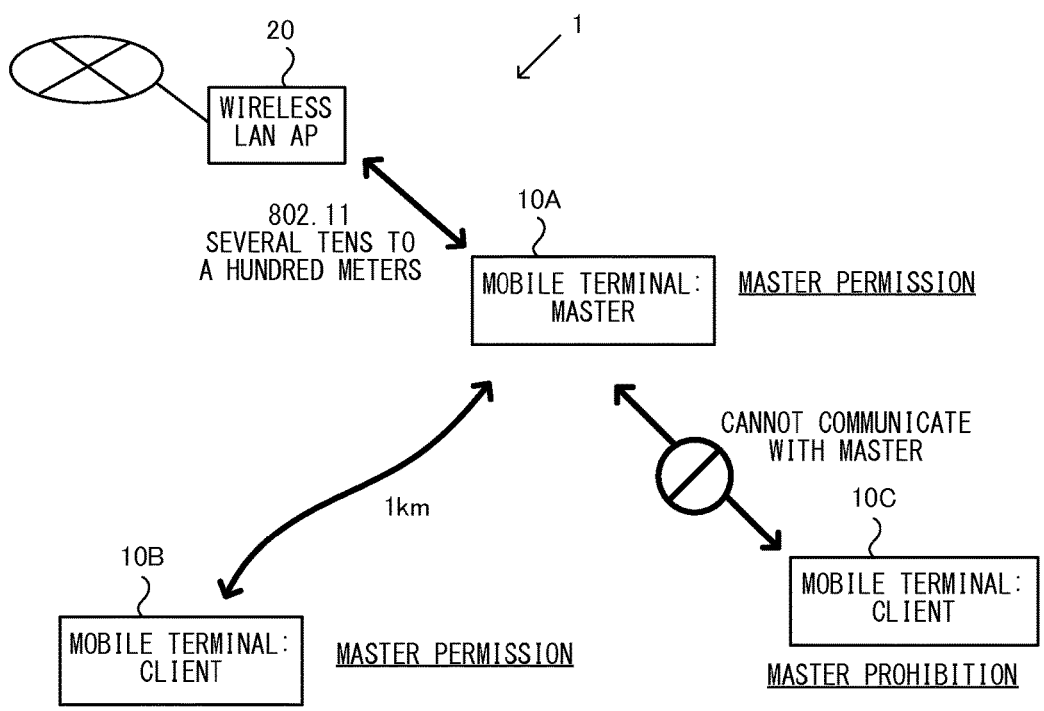
FIG. 6 is a diagram illustrating a non-limiting example of the control of communication when the setting of whether or not to permit the mobile terminal 10 to function as a master is made.

FIG. 6 is a diagram illustrating the control of communication when the setting of whether or not to permit the mobile terminal 10 to function as a master is made. For example, on a setting screen of the mobile terminal 10, the setting of whether or not to permit the mobile terminal 10 as a master is made. If the user wishes to cause the mobile terminal 10 to function as a master (i.e., wishes to provide the relay function to another device), the user sets master permission. If the user does not wish to cause the mobile terminal 10 to function as a master (i.e., does not wish to provide the relay function to another device), the user sets master prohibition.

As shown in FIG. 6, if master permission has been set in the mobile terminal 10A, the mobile terminal 10A transfers data from another mobile terminal 10 to the wireless LAN access point 20. Specifically, if master permission is set in another mobile terminal 10, namely the mobile terminal 10B, the mobile terminal 10B can transmit a connection request for performing the wide-area wireless communication to the mobile terminal 10A (the master). The master receives the connection request, thereby establishing a connection with the mobile terminal 10B (the client). Then, the master transfers the data from the client with which the connection has been established to the wireless LAN access point 20.

On the other hand, a mobile terminal 10C, in which master permission has not been set, cannot be a client. That is, the mobile terminal 10C, in which master permission has not been set, cannot transmit a connection request to the master and therefore cannot establish a connection with the master.

It should be noted that the mobile terminal 10C may transmit a connection request to the master, and the master may determine whether or not master permission has been set in the mobile terminal 10C. Only if master permission has been set in the mobile terminal 10C, the master performs the wide-area wireless communication with the mobile terminal 10C.

If the mobile terminal 10 functions as a master, that is, if the relay function for communicating (relaying the communication) between a client and the wireless LAN access point 20 is provided to the client, the master transmits and receives data between the client and the wireless LAN access point 20. This may increase the processing load of the master or may reduce the speed of data transmission and reception when the master downloads data from the Internet or uploads data to the Internet. Thus, normally, the user of the mobile terminal 10 does not have the advantage of setting master permission in the mobile terminal 10. The configuration, however, is such that only if master permission is set in the mobile terminal 10, the mobile terminal 10 functions also as a client. This motivates the user of the mobile terminal 10 to set master permission. That is, if the user wishes to connect to the Internet via the mobile terminal 10 of another person, using the wide-area wireless communication, the user sets master permission in the mobile terminal 10 of the user themselves. This enables also the user to, instead of providing the relay function to another mobile terminal, enjoy the relay function provided by another mobile terminal.

Figure 7:
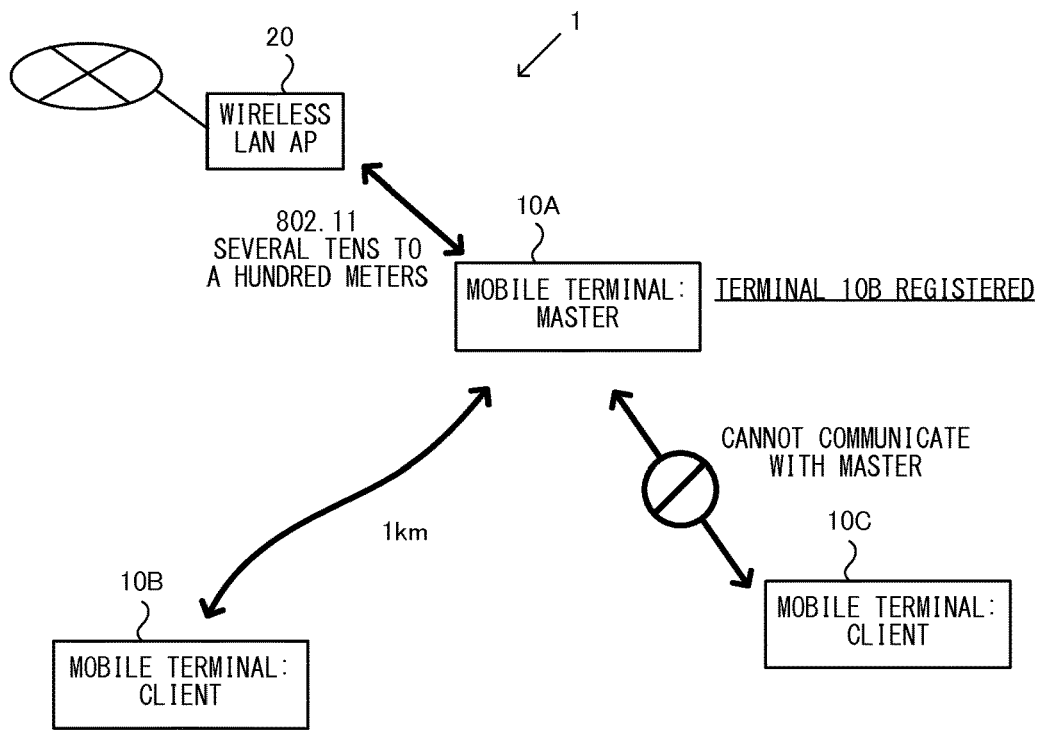
FIG. 7 is a diagram illustrating a non-limiting example of the case where a user registers in advance a mobile terminal to which a relay function using the wide-area wireless communication is to be provided.

FIG. 7 is a diagram illustrating the case where the user registers in advance a mobile terminal to which the relay function using the wide-area wireless communication is to be provided.

As shown in FIG. 7, if in the mobile terminal 10A, another mobile terminal 10, namely the mobile terminal 10B (identification information uniquely assigned to the mobile terminal 10B), has been registered in advance, the mobile terminal 10A provides the relay function using the wide-area wireless communication to the other mobile terminal 10, namely the mobile terminal 10B. That is, if the mobile terminal 10B itself has been registered in the mobile terminal 10A, the mobile terminal 10B can perform the wide-area wireless communication with the mobile terminal 10A and can connect to the wireless LAN access point 20 via the mobile terminal 10A. On the other hand, the mobile terminal 10C, which has not been registered in advance in the mobile terminal 10A, cannot perform the wide-area wireless communication with the mobile terminal 10A and cannot connect to the wireless LAN access point 20 via the mobile terminal 10A.

As shown in FIG. 7, in the case where a communication partner to which the relay function is to be provided is registered in advance, only if identification information of the mobile terminal 10B has been registered in the mobile terminal 10A and identification information of the mobile terminal 10A has been registered in the mobile terminal 10B, the mobile terminal 10A and the mobile terminal 10B may provide the relay function to each other. Further, for example, the configuration may be such that if the mobile terminal 10B has been registered in the mobile terminal 10A, the mobile terminal 10A provides the relay function to the mobile terminal 10B, and if the mobile terminal 10A has not been registered in the mobile terminal 10B, the mobile terminal 10B does not provide the relay function to the mobile terminal 10A.

Figure 8:
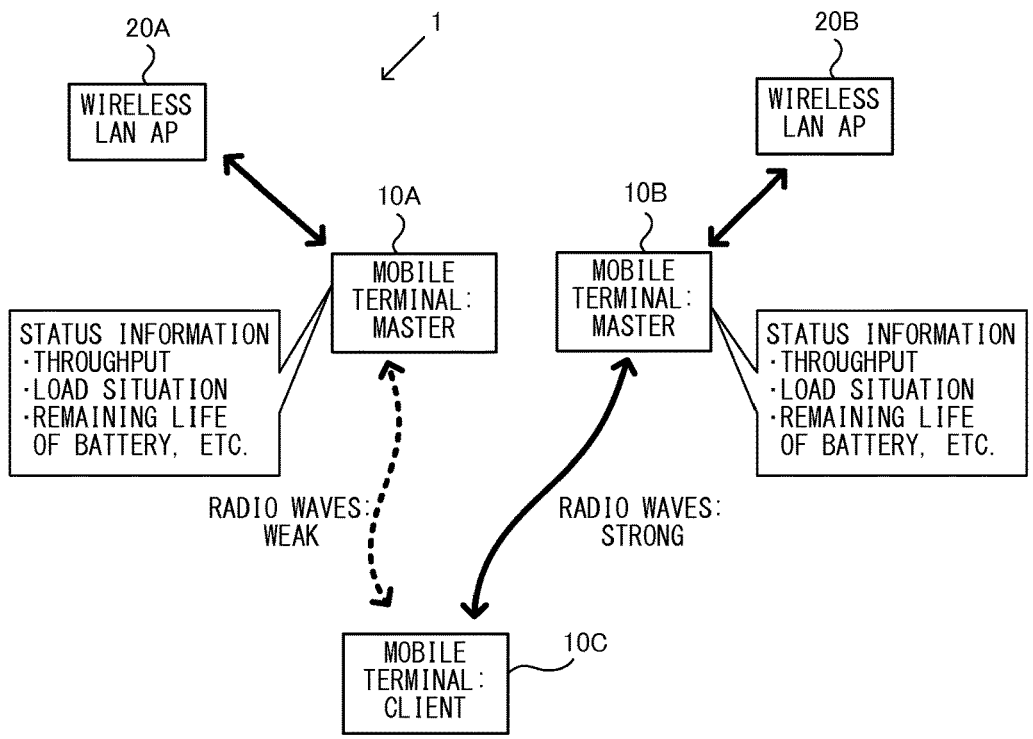
FIG. 8 is a diagram showing a non-limiting example of the state where, if a plurality of masters are present within a second communicable range of a client, the client selects either one of the masters and performs the wide-area wireless communication with the selected master.

Further, if a plurality of masters are present within the second communicable range of a client, the client selects one of the masters with which to perform the wide-area wireless communication. FIG. 8 is a diagram showing the state where, if a plurality of masters are present within the second communicable range of a client, the client selects either one of the masters and performs the wide-area wireless communication with the selected master.

For example, as shown in FIG. 8, if a plurality of masters (10A and 10B) are present within the second communicable range of a client, the client may select any one of the masters based on the strength of radio waves from each master. For example, the client may select the mobile terminal 10B, in which radio waves from the master are strong, as a communication partner in the wide-area wireless communication and may connect to a wireless LAN access point 20B via the mobile terminal 10B. Alternatively, as shown in FIG. 8, for example, each master may save status information of the master itself, and a client may acquire the status information and select the master based on the status information. The status information of the master may be, for example, the communication speed (throughput) between the master and a wireless LAN access point (between the master and the Internet), the load situation of the master, the remaining life of the battery of the master, or the like. Yet alternatively, a client may select any one of a plurality of masters based on the status information of each master and the strength of radio waves from each master.

It should be noted that if a plurality of masters are present within the second communicable range, the client may establish the wide-area wireless communication with the plurality of masters and may transmit data to a wireless LAN access point via any one of the plurality of masters in accordance with the situation of communication for transmitting data.

Figure 9:
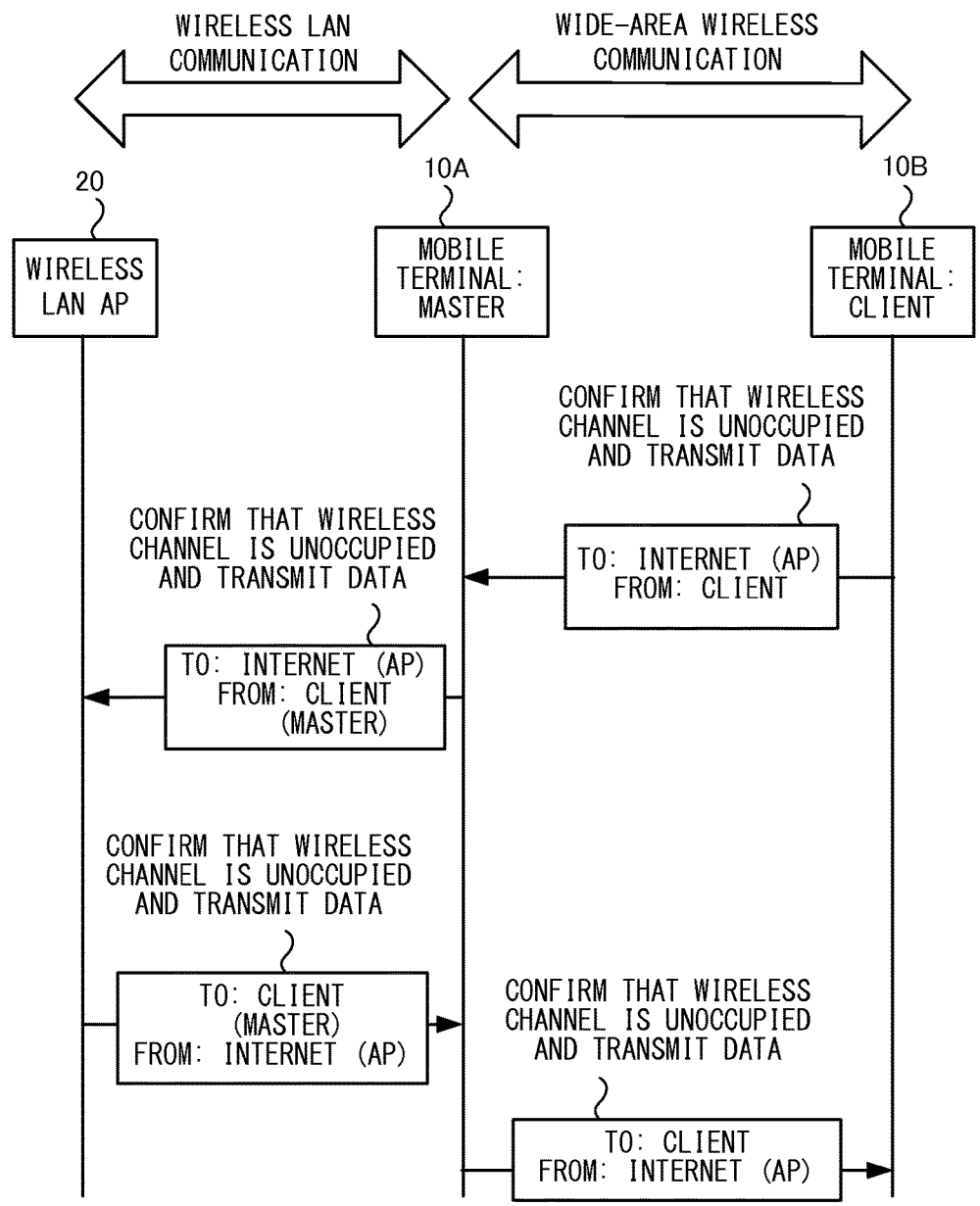
FIG. 9 is a diagram showing a non-limiting example of the flow when a mobile terminal 10B, which functions as a client, transmits and receives data to and from the wireless LAN access point 20 via a mobile terminal 10A, which functions as a master.

Next, a description is given of the flow when a client communicates with a wireless LAN access point via a master. FIG. 9 is a diagram showing the flow when the mobile terminal 10B, which functions as a client, transmits and receives data to and from the wireless LAN access point 20 via the mobile terminal 10A, which functions as a master.

As shown in FIG. 9, first, the mobile terminal 10B transmits data to the mobile terminal 10A. For example, a specific device on the Internet (or the wireless LAN access point 20) is designated as the transmission destination of data, and a client (the mobile terminal 10B) is designated as the transmission source.

More specifically, when transmitting data to the mobile terminal 10A, the mobile terminal 10B confirms that a wireless channel is unoccupied (and for example, noise equal to or greater than a certain amount is not generated). Then, the mobile terminal 10B transmits the data (hereinafter referred to as "pre-data-transmission confirmation"). If no wireless channel is unoccupied, the mobile terminal 10B randomly determines a waiting time and attempts to transmit the data again after the determined waiting time has elapsed. It should be noted that the "wireless channel" here refers to a specific frequency range for use in the transmission and reception of data in certain wireless communication. The state where "a wireless channel is unoccupied" refers to the state where (one or more) wireless channels for use in certain wireless communication are not used for the transmission and reception of data and the total amount of noise in the band is less than or equal to a certain value.

Next, the mobile terminal 10A transfers the data from the mobile terminal 10B to the wireless LAN access point 20. Here, the transmission source of the data is the mobile terminal 10B, which is the client. The mobile terminal 10A, however, converts information about the transmission source so that the transmission source of the data is the mobile terminal 10A. Then, the mobile terminal 10A transmits to the wireless LAN access point 20 the data in which the information about the transmission source has been converted. The mobile terminal 10A stores the fact that the mobile terminal 10A has converted the information about the transmission source. When transmitting the data from the mobile terminal 10B to the wireless LAN access point 20, the mobile terminal 10A makes pre-data-transmission confirmation and then transmits the data. If no wireless channel is unoccupied, the mobile terminal 10A randomly determines a waiting time and attempts to transmit the data again after the determined waiting time has elapsed.

The return communication from the specific device on the Internet is the opposite of the above. The wireless LAN access point 20 receives the data from the specific device on the Internet and transmits the data to the mobile terminal 10A. When transmitting this data to the mobile terminal 10A, the wireless LAN access point 20 makes pre-data-transmission confirmation and then transmits the data.

The mobile terminal 10A transmits the data from the wireless LAN access point 20 to the mobile terminal 10B. Specifically, when transmitting the data to the mobile terminal 10B, the mobile terminal 10A makes pre-data-transmission confirmation and then transmits the data.

As described above, the mobile terminal 10A transfers the data from the mobile terminal 10B to the wireless LAN access point 20. As is clear from the above, the wide-area wireless communication between the mobile terminal 10A and the mobile terminal 10B and the wireless LAN communication between the mobile terminal 10A and the wireless LAN access point 20 are performed by a so-called CSMA/CA (Carrier Sense Multiple Access/Collision Avoidance) method. That is, in the wide-area wireless communication between the mobile terminal 10A and the mobile terminal 10B, one does not unilaterally control the other, and the device for transmitting data confirms the situation of the communication (wireless) channel of the other device and determines whether or not the device itself can transmit the data.

That is, the communication protocol of the wide-area wireless communication between the mobile terminal 10A and the mobile terminal 10B is substantially the same as the communication protocol of the wireless LAN communication between the mobile terminal 10A and the wireless LAN access point 20. Specifically, these communication protocols are substantially the same except for physical differences (partial differences in physical layers) in frequency band of radio waves, bandwidth, and the like. Here, the communication protocols being substantially the same means that, for example, the procedures of basic communication such as the above CSMA/CA method (including the procedures for establishing a connection and the like) are the same, and there may be a difference in physical layers as described above or a difference in the detailed settings of data link layers. For example, the wide-area wireless communication and the wireless LAN communication may be different in the above waiting time when transmitting data. For example, the waiting time in the wide-area wireless communication may be longer (or shorter) than the waiting time in the wireless LAN communication. Further, in the wide-area wireless communication and the wireless LAN communication, the structure of a basic frame (a unit of transmission data including data and a header) may be the same. The structure of a basic frame being the same means that essential information of a header portion (e.g., the transmission destination MAC address, the transmission source MAC address, information about the length of data, and the like) and the position of the essential information are the same, but additional information that is not essential may be different.

As described above, in the exemplary embodiment, the wide-area wireless communication and the wireless LAN communication use substantially the same communication protocols.

(Details of Processing)

Figure 10:
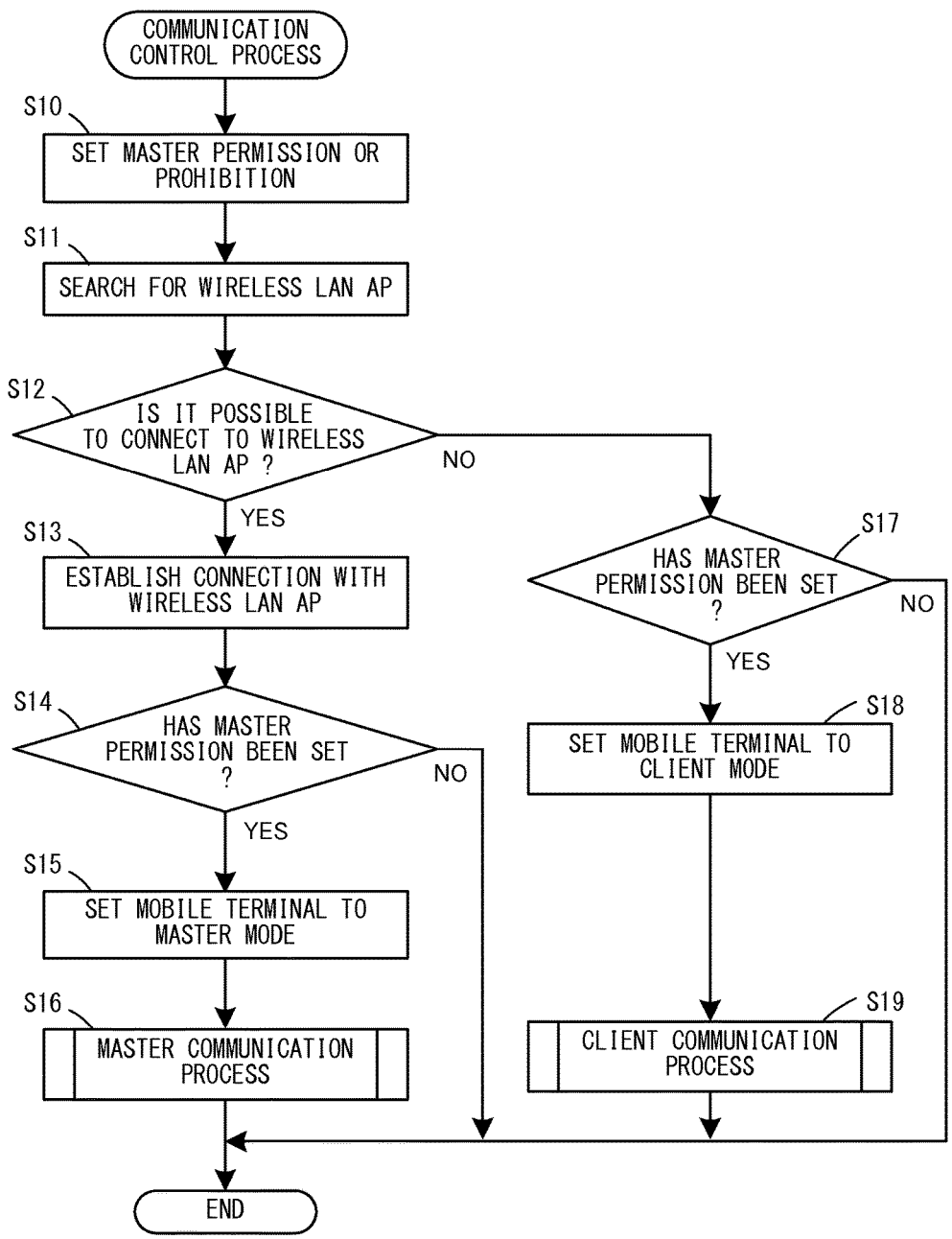
FIG. 10 is a flow chart of a non-limiting example of a communication control process performed by the mobile terminal 10.
Figure 11:
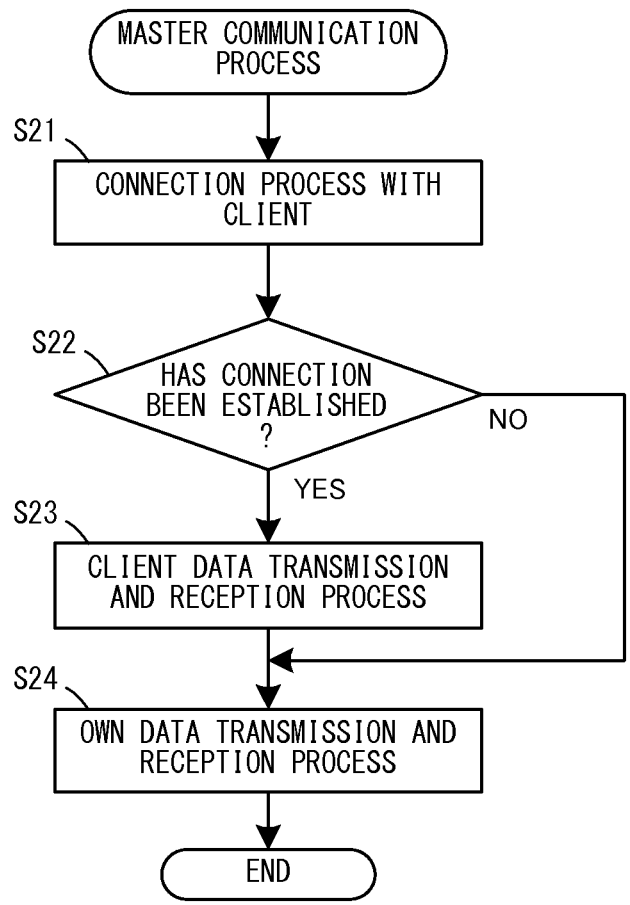
FIG. 11 is a detailed flow chart of a non-limiting example of a master communication process in step S16 in FIG. 10.
Figure 12:
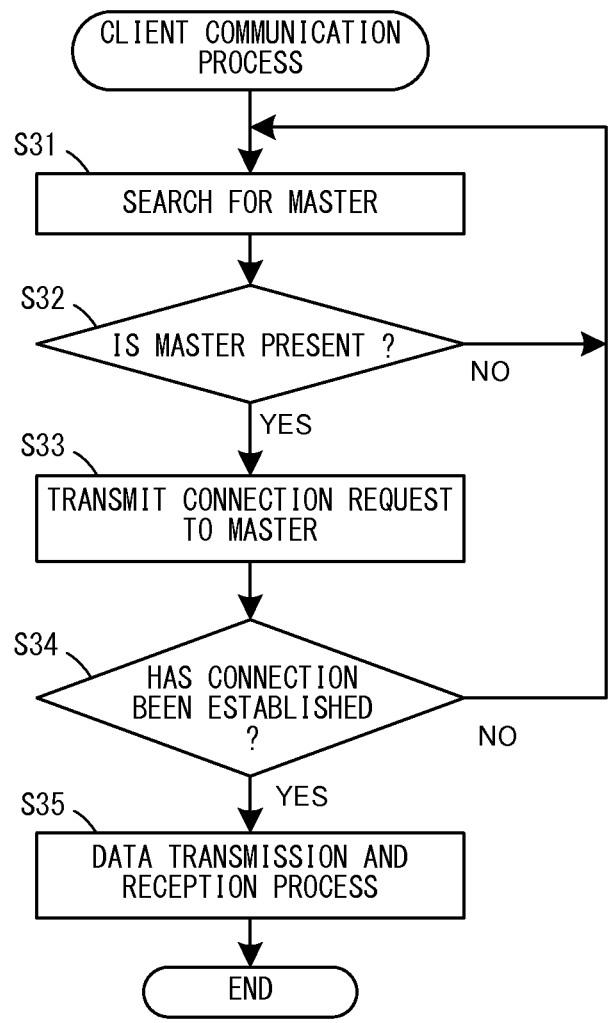
FIG. 12 is a detailed flow chart of a non-limiting example of a client communication process in step S19 in FIG. 10.

Next, with reference to FIGS. 10 to 12, the details of the processing performed by the mobile terminal 10 are described. FIG. 10 is a flow chart of a communication control process performed by the mobile terminal 10. The processing shown in FIGS. 10 to 12 is performed by the components of the mobile terminal 10 (the information processing section 11, the wireless LAN communication module 14, and the wide-area wireless communication module 16) executing a communication program, or by dedicated circuits such as ASICs included in the components. Further, in examples shown in FIGS. 10 to 12, a description is given of the processing when the user sets master permission or prohibition as described above.

As shown in FIG. 10, the mobile terminal 10 sets master permission or prohibition (step S10). For example, when the mobile terminal 10 has been first started or the user has given a setting instruction, the mobile terminal 10 performs the process of step S10. In step S10, the mobile terminal 10 displays on the display section 12 a screen for determining whether or not to permit the mobile terminal 10 to function as a master. Then, in accordance with an input from the user, the mobile terminal 10 makes a setting.

Next, the mobile terminal 10 searches for a wireless LAN access point (step S11). Specifically, the mobile terminal 10 searches for a wireless LAN access point having an SSID that matches the SSID set in the mobile terminal 10 itself. The search for a wireless LAN access point may be performed by the mobile terminal 10 transmitting a search packet and receiving a response to the search packet, or may be performed by the mobile terminal 10 receiving a management packet (beacon) periodically transmitted from a wireless LAN access point. As a result of the search, the mobile terminal 10 determines whether or not it is possible to connect to a wireless LAN access point (step S12). If it is possible to connect to a wireless LAN access point (step S12: YES), the connection between the mobile terminal 10 and the wireless LAN access point is established (step S13).

Specifically, in step S12, the mobile terminal 10 performs an authentication process between the mobile terminal 10 and a wireless LAN access point found by the search. In the authentication process, the mobile terminal 10 transmits a key stored in the mobile terminal 10 itself to the wireless LAN access point and receives a result from the access point. If the authentication has normally ended, predetermined processing is performed. Then, in step S13, the connection between the mobile terminal 10 and the access point is completed. It should be noted that the mobile terminal 10 may search for wireless LAN access points present around the mobile terminal 10 and display a list of the wireless LAN access points, and the user may select any one of the access points from the displayed list, thereby establishing the connection between the mobile terminal 10 and the access point.

If, on the other hand, the mobile terminal 10 has determined that it is not possible to connect to a wireless LAN access point (step S12: NO), the mobile terminal 10 next performs the process of step S17. Specifically, in step S12, if a wireless LAN access point has not been found within the first communicable range, or if a wireless LAN access point has been found but it is not possible to connect to the access point (authentication has not normally ended), the mobile terminal 10 determines "NO".

After the connection between the mobile terminal 10 and the access point has been established, the mobile terminal 10 determines whether or not master permission has been set (step S14). If master permission has been set (step S14: YES), the mobile terminal 10 sets the mobile terminal 10 itself to a master mode (step S15). Then, the mobile terminal 10 performs a master communication process (step S16). The details of the master communication process will be described later. If master permission has not been set (step S14: NO), the mobile terminal 10 does not operate either as a master or a client, but sets the mobile terminal 10 itself to a mode for solely connecting to the wireless LAN access point (a sole communication mode) and ends the processing shown in FIG. 10. It should be noted that in the sole communication mode, the mobile terminal 10 performs the wireless LAN communication with the wireless LAN access point with which the connection has been completed.

If, on the other hand, it has been determined in step S12 that it is not possible to connect to a wireless LAN access point (step S12: NO), the mobile terminal 10 determines whether or not master permission has been set (step S17). If master permission has not been set (step S17: NO), the mobile terminal 10 ends the processing shown in FIG. 10. In this case, the mobile terminal 10 cannot perform either the wireless LAN communication or the wide-area wireless communication.

If master permission has been set (step S17: YES), the mobile terminal 10 sets the mobile terminal 10 itself to a client mode (step S18). Then, the mobile terminal 10 performs a client communication process (step S19).

(Master Communication Process)

Next, the master communication process in step S16 in FIG. 10 is described. FIG. 11 is a detailed flow chart of the master communication process in step S16 in FIG. 10.

First, the mobile terminal 10 that functions as a master (hereinafter referred to as a "master") performs a connection process with a client (step S21). Specifically, the master determines whether or not a connection request has been received from another mobile terminal 10 that functions as a client (hereinafter referred to as a "client"). If a connection request has been received, the master performs a connection process for establishing a connection with the client. In the connection process, for example, the master and the client exchange information for authentication, thereby performing an authentication process. Further, the master and the client exchange information for identifying a device. It should be noted that in the connection process, the master and the client may establish a connection without performing an authentication process.

After step S21, the master determines whether or not a connection with the client has been established (step S22). If it has been determined that a connection with the client has been established (step S22: YES), the master stores identification information of the client in a storage section of the master itself (e.g., the above RAM or another storage section) and next performs the process of step S23. If it has been determined that a connection with the client has not been established (step S22: NO), the master next performs the process of step S24.

In step S23, the master performs a client data transmission and reception process (step S23). The client data transmission and reception process is the process of communicating (relaying the communication) between the client and the wireless LAN access point 20 (the Internet). Specifically, if having received data to the wireless LAN access point 20 (the Internet) from the client with which the connection has been established, the master transfers the data to the wireless LAN access point 20. Further, if having received data to the client from the wireless LAN access point 20 (the Internet), the master transmits the data to the client. Hereinafter, data from the client to the wireless LAN access point 20 and data from the wireless LAN access point 20 to the client are occasionally referred to as "client data".

The client data transmission and reception process in step S23 is performed always or as needed after the connection between the master and the client has been established. That is, every time the master has received data from the client with which the connection has been established, the master transfers the data to the wireless LAN access point 20. Every time the master has received data from the wireless LAN access point 20 to the client, the master transfers the data to the client.

It should be noted that if the master has not received data from the client with which the connection has been established (i.e., the client stored in the storage section of the master by the connection process) for a predetermined time, the master terminates the connection with the client. That is, the master deletes the identification information of the client stored in the storage section and terminates the connection with the client. It should be noted that even if the client has no data to be transmitted, the client may transmit data for maintaining the connection to the master at predetermined time intervals. Further, the master may, for example, transmit data for maintaining the connection to the client at predetermined time intervals. The client may return a response to the data from the master.

Next, the master performs an own data transmission and reception process (step S24). The own data transmission and reception process is the process of transmitting and receiving data between the master and the wireless LAN access point 20 (the Internet). For example, the master executes an application to generate data in the master itself, or generates, in the master itself, data including an access request for accessing a server on the Internet. The master can transmit the data generated by the master itself to the wireless LAN access point 20. That is, the master communicates (relays the communication) between the client and the wireless LAN access point 20 as described above and also communicates itself with the wireless LAN access point 20 (the Internet). Specifically, the master transmits, to the wireless LAN access point 20, data from the master itself to the wireless LAN access point 20 (the Internet). Further, the master receives, from the wireless LAN access point 20, data from the wireless LAN access point 20 to the master itself.

The own data transmission and reception process in step S24 is performed always or as needed while the connection between the master and the wireless LAN access point 20 is maintained. It should be noted that even if there is no data to be transmitted and received, data may be transmitted and received at predetermined time intervals to maintain the connection between the master and the wireless LAN access point 20.

(Client Communication Process)

Next, the client communication process in step S19 in FIG. 10 is described. FIG. 12 is a detailed flow chart of the client communication process in step S19 in FIG. 10.

First, a client searches for a master (step S31). Next, based on the result of the search in step S31, the client determines whether or not a master is present within the second communicable range of the client (step S32). If a master is present (step S32: YES), the client next performs the process of step S33. If a master is not present within the second communicable range (step S32: NO), the client performs the process of step S31 again.

For example, in step S31, the client transmits a search packet to unspecified devices, using the wide-area wireless communication module 16 (transmits a search packet without specifying a destination), thereby searching for a master. Here, the second communicable range when the wide-area wireless communication module 16 is used is broader than the first communicable range when the wireless LAN communication module 14 is used. If having received the search packet, a master present within the second communicable range returns a response packet to the client having transmitted the search packet. If having received the response packet, the client determines that a master is present within the second communicable range (step S32: YES). If the client has not received a response packet even after a predetermined time has elapsed since the client had transmitted the search packet, the client determines that a master is not present (step S32: NO).

Alternatively, for example, a master may transmit a management packet at predetermined time intervals. In step S31, the client may receive the management packet, thereby searching for a master. Specifically, a master transmits a management packet to unspecified devices at predetermined time intervals (transmits a management packet without specifying a destination). In step S31, the client attempts to receive the management packet. If having received the management packet, the client determines that a master is present within the second communicable range (step S32: YES). If, on the other hand, the client has not received the management packet from the master in a predetermined time, the client determines that a master is not present within the second communicable range (step S32: NO). It should be noted that the intervals for transmitting a management packet between the master and the client may be the same as or different from the intervals for transmitting a management packet between the master and the wireless LAN access point. That is, the intervals for transmitting a management packet in the wide-area wireless communication may be different from the intervals for transmitting a management packet in the wireless LAN communication. The intervals for transmitting a management packet in the wide-area wireless communication may be longer than the intervals for transmitting a management packet in the wireless LAN communication.

In step S33, the client transmits a connection request to the master found by the search. In accordance with the connection request, a connection process is performed between the master and the client as described above. It should be noted that if a plurality of masters have been found as a result of the search in step S31, the client may select any one of the plurality of masters, using the above method and transmit a connection request to the selected master.

After step S33, the client determines whether or not a connection with the master has been established (step S34). If a connection with the master has not been established (step S34: NO), the client performs the process of step S31 again. It should be noted that if the processes of steps S31 to S34 have repeatedly been performed and a predetermined time has elapsed, the client may end the processing shown in FIG. 12.

If a connection with the master has been established (step S34: YES), the client performs a data transmission and reception process (step S35). For example, the client executes an application to generate data in the client itself, or generates, in the client itself, data including an access request for accessing a server on the Internet. The client transmits the data generated by the client itself to the wireless LAN access point 20 via the master. Specifically, if the client has data to be transmitted to the wireless LAN access point 20 (the Internet), the client transmits the data to the wireless LAN access point 20 via the master. Further, in step S35, the client receives data from the wireless LAN access point 20 via the master.

The data transmission and reception process in step S35 is performed always or as needed after the connection between the client and the master has been established. That is, every time data to be transmitted to the wireless LAN access point 20 has been generated, the client transmits the data via the master.

As described above, in the exemplary embodiment, a master can communicate with the wireless LAN access point 20 present within the first communicable range (e.g., a distance of several tens of meters from the master), using the wireless LAN communication module 14 and can also communicate with a client present within the second communicable range (e.g., a distance of 1 km from the master), using the wide-area wireless communication module 16. The client can communicate with the wireless LAN access point 20 via the master by the wide-area wireless communication using the wide-area wireless communication module 16. This enables the client to connect to the wireless LAN access point 20 and connect to the Internet or the like via the master even if the client is not directly connected to the wireless LAN access point 20.

(Variations)

It should be noted that the above exemplary embodiment is merely illustrative and for example, may be changed as follows.

For example, in the exemplary embodiment, the wireless LAN communication is performed using the wireless LAN communication module 14, and wide-area wireless communication is performed using the wide-area wireless communication module 16. In another exemplary embodiment, the wireless LAN communication and the wide-area wireless communication may be performed using a common communication module.

Further, the frequency bands and the bandwidths in the wireless LAN communication in the above exemplary embodiment are merely illustrative, and also the frequency bands and the bandwidths in the wide-area wireless communication are merely illustrative.

Further, in the exemplary embodiment, the user makes the setting of whether or not to permit the mobile terminal 10 to function as a master. That is, in the exemplary embodiment, if the user has set master permission, the relay function is provided to any other mobile terminal. Further, if the user has registered another specific mobile terminal, the relay function is provided to the other mobile terminal. In another exemplary embodiment, the setting of whether or not to permit the mobile terminal 10 to function as a master may be made without the setting by the user.

Further, in the exemplary embodiment, the mobile terminal 10 is assumed to be a handheld game apparatus, a mobile phone, a tablet terminal, or the like. In another exemplary embodiment, the mobile terminal may be any information processing apparatus. The information processing apparatus can perform the wireless LAN communication and the wide-area wireless communication as described above, can also perform an image display process and make calculations, and may be able to execute a predetermined application stored in the information processing apparatus or acquired externally from the Internet or the like. Further, the information processing apparatus may include a wired LAN module so that the information processing apparatus can directly connect to a wired LAN.

Further, the processing shown in the flow charts in the exemplary embodiment is merely illustrative. Alternatively, a part of the above processing may not be performed, or another type of processing other than the above processing may be added. Further, the processing order may be any order.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A mobile communication terminal having a wireless communication function, the communication terminal comprising:

a first communication module configured for wireless communication up to a first communicable range and to perform wireless communication over a 802.11 wireless LAN with a wireless LAN access point within the first communicable range, wherein the wireless LAN access point includes a 802.11 wireless LAN interface to the 802.11 wireless LAN and a wired interface to the Internet;

a second communication module configured for wireless communication up to a second communicable range corresponding to a greater communication distance than the first communication range and to perform wireless communication with a second communication terminal present within the second communicable range; and a transmitter configured to transmit, using the first communication module, data which is transmitted from the second communication terminal and received by the second communication module, over the 802.11 wireless LAN to the wireless LAN access point, thereby communicating between the second communication terminal and the Internet via at least the wired interface of the wireless LAN access point.

2. The communication terminal according to claim 1, wherein the second communication module communicates with the second communication terminal, using at least one of a method of using a plurality of antennas, a method of using a bandwidth narrower than a bandwidth in communication using the first communication module, and a method of using a radio wave having a frequency lower than a frequency in communication using the first communication module.

3. The communication terminal according to claim 1, wherein a protocol of communication between the communication terminal and the second communication terminal performed using the second communication module is substantially the same as a protocol of communication between the communication terminal and the access point performed using the first communication module.

4. The communication terminal according to claim 1, further comprising a setter configured to make a setting of whether or not to permit the transmitter to communicate between the second communication terminal and the wireless LAN access point, wherein
   if the setter has permitted the transmitter to communicate between the second communication terminal and the wireless LAN access point, the transmitter communicates between the second communication terminal and the wireless LAN access point.

5. The communication terminal according to claim 4, wherein
   the setter sets another communication terminal for which the transmitter is permitted to communicate between the other communication terminal and the wireless LAN access point, and
   the transmitter communicates between the other communication terminal that has been set and the wireless LAN access point.

6. The communication terminal according to claim 1, wherein
   the first communication module is able to transmit data generated by the communication terminal to the wireless LAN access point in addition to data from the second communication terminal.

7. The communication terminal according to claim 1, wherein the communication terminal communicates, using the second communication module, with a third communication terminal,
wherein the third communication terminal communicates with the wireless LAN access point using a third communication module configured for wireless communication up to the first communicable range, and communicates with the communication terminal, using a forth communication module configured for wireless communication up to the second communicable range, and
wherein the second communication module transmits, via the third communication terminal, data to the wireless LAN access point communicably connected to the third communication terminal.

8. The communication terminal according to claim 7, wherein if the communication terminal cannot communicate with the wireless LAN access point, using the first communication module of the communication terminal, the second communication module of the communication terminal automatically connects to the third communication terminal and communicates via the third communication terminal with a wireless LAN access point connected to the third communication terminal.

9. The communication terminal according to claim 7, further comprising a setter configured to make a setting of whether or not to permit the transmitter to communicate between the second communication terminal and the wireless LAN access point, wherein
if the setter has permitted the transmitter to communicate between the second communication terminal and the wireless LAN access point, the transmitter communicates between the second communication terminal and the wireless LAN access point, and
if the setter has permitted the transmitter to communicate between the second communication terminal and the wireless LAN access point, the second communication module of the communication terminal communicates via the third communication terminal with a wireless LAN access point connected to the third communication terminal.

10. The communication terminal according to claim 1, wherein the communication terminal and the second communication terminal are apparatuses of the same model.

11. The communication terminal according to claim 7, wherein the communication terminal and the second communication terminal or the third communication terminal are apparatuses of the same model.

12. The communication terminal according to claim 1, wherein the communication terminal is a handheld apparatus.

13. The communication terminal according to claim 1, wherein the communication terminal is capable of executing a predetermined application.

14. A communication system including a first mobile communication terminal and a second communication terminal,
the first communication terminal comprising:
a first communication module configured for wireless communication up to a first communicable range and to perform wireless communication over a 802.11 wireless LAN with a wireless LAN access point present within the first communicable range, wherein the wireless LAN access point includes a 802.11 wireless LAN interface to the 802.11 wireless LAN and a wired interface to the Internet;
a second communication module configured for wireless communication up to a second communicable range corresponding to a greater communication distance than the first communication range and to perform wireless communication with the second communication terminal present within the second communicable range; and
a transmitter configured to transmit, using the first communication module, data which is transmitted from the second communication terminal and received by the second communication module, over the 802.11 wireless LAN to the wireless LAN access point, thereby communicating between the second communication terminal and the Internet via at least the wired interface of the wireless LAN access point,
the second communication terminal comprising
a third communication module configured for wireless communication up to the second communicable range and to perform wireless communication with the first communication terminal present within the second communicable range, wherein
the third communication module of the second communication terminal communicates with the wireless LAN access point via the first communication terminal.

15. The communication system according to claim 14, wherein the second communication terminal communicates with the wireless LAN access point via the first communication terminal without having information for directly communicating with the wireless LAN access point.

16. The communication system according to claim 14, wherein
the communication system includes a plurality of first communication terminal,
the second communication terminal further comprises:
an acquirer configured to acquire status information of the plurality of first communication terminals present within the second communicable range; and
a selector configured to select any one of the plurality of first communication terminals based on the status information acquired by the acquirer, and
the third communication module of the second communication terminal communicates with the wireless LAN access point via the first communication terminal selected by the selector.

17. A non-transitory computer-readable storage medium having stored therein a communication program executed by at least one computer of a mobile communication terminal having a wireless communication function, the communication program causing the at least one computer to execute:
a first communication process for wireless communication up to a first communicable range and for performing wireless communication over a 802.11 wireless LAN with a wireless LAN access point present within a first communicable range wherein the wireless LAN access point includes a 802.11 wireless LAN interface to the 802.11 wireless LAN and a wired interface to the Internet;
a second communication process for wireless communication up to a second communicable range corresponding to a greater communication distance than the first communication range and for performing wireless communication with a second communication terminal present within the second communicable range; and
a transmission process for transmitting, using the first communication process, data which is transmitted from the second communication terminal and received by the second communication process, over the 802.11 wireless LAN to the wireless LAN access point by the first communication process, thereby communicating between the second communication terminal and the Internet via at least the wired interface of the wireless LAN access point.

18. A communication method implemented by a mobile communication terminal having a wireless communication function and including at least one processor, the communication method comprising:
performing a first communication process for wireless communication up to a first communicable range and wireless communication over a 802.11 wireless LAN with a wireless LAN access point present within the first communicable range, wherein the wireless LAN access point includes a 802.11 wireless LAN interface to the 802.11 wireless LAN and a wired interface to the Internet;
performing a second communication process for wireless communication up to a second communicable range corresponding to a greater communication distance than the first communication range and wireless communication with a second communication terminal present within the second communicable range; and
performing a transmission process for transmitting, using the first communication process, data which is transmitted from the second communication terminal and received by the second communication process, over the 802.11 wireless LAN to the wireless LAN access point, thereby communicating between the second communication terminal and the Internet via at least the wired interface of the wireless LAN access point.

19. A mobile communication device comprising:
a first antenna configured for wireless communication over a 802.11 wireless network with a wireless LAN access point located within a first communicable range, wherein the wireless LAN access point includes a 802.11 wireless LAN interface to the 802.11 wireless network and a wired interface to the Internet;
a second antenna configured for wireless communication within a second communicable range corresponding to a greater communication distance than the first communication range;
at least one processor configured to:
  receive, using the second antenna, data which is transmitted by another communication device; and
  transmit, using the first antenna, the data over the 802.11 wireless LAN to the wireless LAN access point, thereby providing for communicating between the other communication device and the Internet via at least the wired interface of the wireless LAN access point.

* * * * *